(12) United States Patent
Helbing (10) Patent No.: US 8,068,140 B2
(45) Date of Patent: Nov. 29, 2011

(54) STILL IMAGE STABILIZATION SUITABLE FOR COMPACT CAMERA ENVIRONMENTS

(75) Inventor: Rene Helbing, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 669 days.

(21) Appl. No.: 11/500,148

(22) Filed: Aug. 7, 2006

(65) Prior Publication Data

US 2008/0030587 A1 Feb. 7, 2008

(51) Int. Cl.
*H04N 5/228* (2006.01)
*H04N 5/235* (2006.01)
*H04N 3/14* (2006.01)
*H04N 5/335* (2011.01)
*G06K 9/40* (2006.01)

(52) U.S. Cl. ............ 348/208.4; 348/208.99; 348/208.1; 348/208.2; 348/208.6; 348/208.12; 348/222.1; 348/229.1; 348/294; 348/296; 382/254; 382/255; 382/260

(58) Field of Classification Search ............... 348/208.4, 348/208, 362, 229.1, 221.1, 230.1, 207.99, 348/208.99–208.16, 222.1, 294–308
See application file for complete search history.

(56) References Cited

U.S. PATENT DOCUMENTS

| | | | |
|---|---|---|---|
| 4,819,070 A | 4/1989 | Hynecek | |
| 5,978,600 A | 11/1999 | Takeuchi et al. | |
| 6,115,065 A | 9/2000 | Yadid-Pecht et al. | |
| 6,747,690 B2 | 6/2004 | Molgaard | |
| 6,778,210 B1 * | 8/2004 | Sugahara et al. | 348/208.4 |
| 6,809,766 B1 | 10/2004 | Krymski et al. | |
| 7,756,407 B2 * | 7/2010 | Raskar | 396/55 |
| 2003/0030744 A1 | 2/2003 | Baer | |
| 2003/0202115 A1 | 10/2003 | Sugimoto et al. | |
| 2004/0130628 A1 * | 7/2004 | Stavely | 348/208.4 |
| 2005/0057660 A1 * | 3/2005 | Nonaka et al. | 348/208.99 |
| 2005/0206739 A1 * | 9/2005 | Kamoshida | 348/208.99 |
| 2005/0231603 A1 * | 10/2005 | Poon | 348/208.99 |
| 2006/0127084 A1 * | 6/2006 | Okada | 396/439 |
| 2006/0140602 A1 * | 6/2006 | Kurata et al. | 396/55 |
| 2006/0170784 A1 * | 8/2006 | Clarke et al. | 348/208.99 |
| 2007/0058073 A1 * | 3/2007 | Steinberg et al. | 348/362 |
| 2007/0092244 A1 * | 4/2007 | Pertsel et al. | 396/153 |
| 2007/0297026 A1 * | 12/2007 | John | 358/486 |

* cited by examiner

*Primary Examiner* — Jason Chan
*Assistant Examiner* — Michael Osinski (57) ABSTRACT

Still image apparatus and methods that are suitable for compact camera environments are described. In another aspect, image segments are captured during corresponding exposure intervals of a frame exposure period. Respective motion sensor signals are generated during the respective exposure intervals of the image segments. One or more corresponding movement measures are determined from the respective motion sensor signals for each of the exposure intervals. The image segments are combined into an output image based on the one or more corresponding movement measures.

18 Claims, 7 Drawing Sheets

STILL IMAGE STABILIZATION SUITABLE FOR COMPACT CAMERA ENVIRONMENTS

BACKGROUND

Image stabilization techniques have been used in a wide variety of different applications, including surveillance applications, vehicle-mounted image sensor applications, robotics applications, and consumer electronics applications. Image stabilization is the process of eliminating or at least reducing the effects of unwanted image sensor motion (e.g., unwanted image sensor vibration or irregular image sensor motion) on still images or video sequences. Many image stabilization approaches attempt to eliminate or at least reduce the amount of unwanted image sensor motion relative to a scene while preserving any intentional image sensor motion. In this regard, these image stabilization techniques synthesize a new image or video sequence from the perspective of a stabilized image sensor trajectory.

Among the primary classes of image stabilization techniques are mechanical image stabilization methods, electromechanical image stabilization methods, optical image stabilization methods, and electronic image stabilization methods. Mechanical image stabilization systems attempt to dampen the motion of the image sensor (or just the lens/image sensor subsystem). Electromechanical image stabilization systems detect motion of the image sensor using, for example, an inertial sensor, and alter the position or orientation of the image sensor to offset the detected image sensor motion. Optical image stabilization approaches stabilize the image of the sensor by displacing the image as it is formed by the lens system in a way that offsets image sensor motion. Electronic image stabilization techniques involve modifying the captured images in ways that makes the captured images appear to have been captured by a more stable image sensor.

Many image stabilization techniques are not suitable for compact camera environments, such as handheld electronic devices (e.g., mobile telephones), cameras designed for desktop and mobile computers (often referred to as "pc cameras"), and other embedded environments. For example, optical image stabilization techniques require large and bulky components that cannot be accommodated in most compact camera environments. Electronic image stabilization techniques, on the other hand, are computationally intensive and require significant memory resources, making them unsuitable in compact application environments in which processing and memory resources typically are significantly constrained.

What are needed are systems and methods of reducing motion-induced blur in still images within the significant size, processing, and memory constraints of typical compact camera environments.

SUMMARY

In one aspect, the invention features an apparatus that includes an image sensor, a motion sensor, and a processing system. The image sensor is operable to capture image segments during corresponding exposure intervals of a frame exposure period. The motion sensor is operable to generate respective motion sensor signals during the respective exposure intervals of the image segments. The processing system is operable to determine from the respective motion sensor signals one or more corresponding movement measures for each of the exposure intervals and combine the image segments into an output image based on the one or more corresponding movement measures.

In another aspect, the invention features a method in accordance with which image segments are captured during corresponding exposure intervals of a frame exposure period. Respective motion sensor signals are generated during the respective exposure intervals of the image segments. One or more corresponding movement measures are determined from the respective motion sensor signals for each of the exposure intervals. The image segments are combined into an output image based on the one or more corresponding movement measures.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not

I. Introduction

A. Overview

Figure 1:
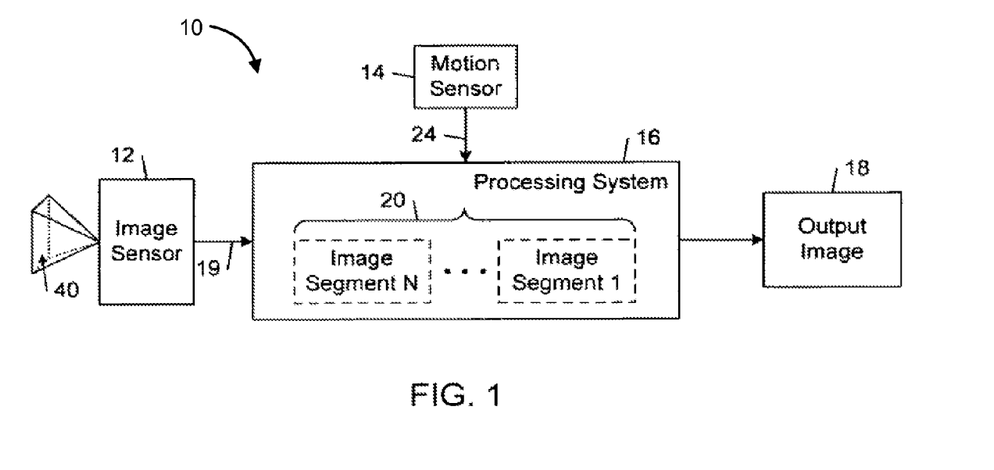
FIG. 1 is a block diagram of an embodiment of an image capture system.

FIG. 1 shows an embodiment of an image capture system 10 that includes an image sensor 12, a motion sensor 14, and a processing system 16. The image capture system 10 is capable of producing an output still image 18 with reduced motion-induced blur. The image capture system 10 may be implemented with relatively small and inexpensive components that have modest processing power and modest memory capacity. As a result, the image capture system 10 is highly suitable for incorporation in compact camera environments that have significant size, processing, and memory constraints, including but not limited to handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), pc cameras, and other embedded environments.

Figure 2:
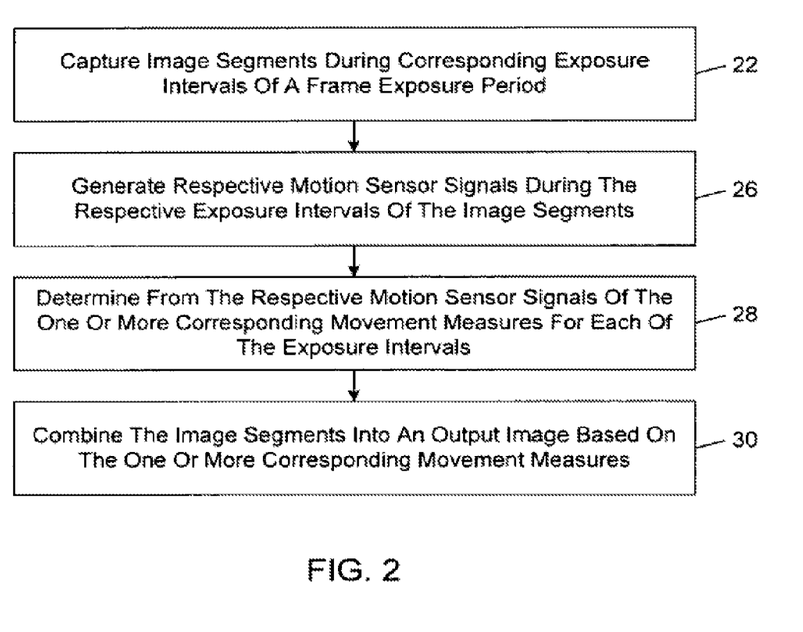
FIG. 2 is a flow diagram of an embodiment of an image capture method.

FIG. 2 shows an embodiment of a method by which the image capture system 10 captures the output image 18.

In accordance with this method, the image capture system 10 captures image segments 20 during corresponding exposure intervals of a frame exposure period (FIG. 2, block 22). In some embodiments, the image sensor 12 captures image data 19 that corresponds directly to the image segments 20. In other embodiments, the image sensor 12 captures image data 19 and the processing system 18 associates the image data 19 to respective ones of the image segments 20. Each of the image segments 20 includes image data that is used by the processing system 16 to generate the output image 18. The "exposure interval" of an image segment is the period during which light corresponding to a respective one of the image segments 20 is being integrated by an active area in the capture plane of the image sensor 12. The "frame exposure period" is the space of time over which the all the image segments 20 of the output image 18 are captured by the image sensor 12.

The motion sensor 14 generates respective motion sensor signals 24 during the respective exposure intervals of the image segments 20 (FIG. 2, block 26). The motion sensor signals 24 are indicative of motion of the image sensor 12 in relation to the scene being imaged. The motion sensor signals 24 may correspond to, for example, optical or inertial measurements. The motion sensor 14 typically generates the motion sensor signals 24 in response to its own movements in relation to the scene being imaged. The movements of the motion sensor 14, however, are correlated with the movements of the image sensor 12 such that that motion sensor signals 24 are indicative of the movements of both the motion sensor 14 and the image sensor 12. In a typical implementation, for example, the motion sensor 14 and the image sensor 12 are mounted to a common support frame that causes the motion sensor 14 and the image sensor 12 to move together in unison.

The processing system 16 determines from the respective motion sensor signals 24 one or more corresponding movement measures for each of the exposure intervals (FIG. 2, block 28). In some embodiments, the movement measures correspond to at least one of position coordinates and displacements in the coordinate system of the capture plane of the image sensor 12.

The processing system 16 combines the image segments 20 into the output image 18 based on the one or more corresponding movement measures (FIG. 2, block 30). In this process, the processing system 16 uses the movement measures to correct for relative spatial shifting of the image segments 20 that was caused by motion of the image sensor 12 over the course of the frame exposure period. The processing system 16 derives the values of the pixels of the output image 18 from the values of the pixels of the motion-corrected image segments.

B. Exemplary Embodiments of the Components of the Image Capture System

Figure 3:
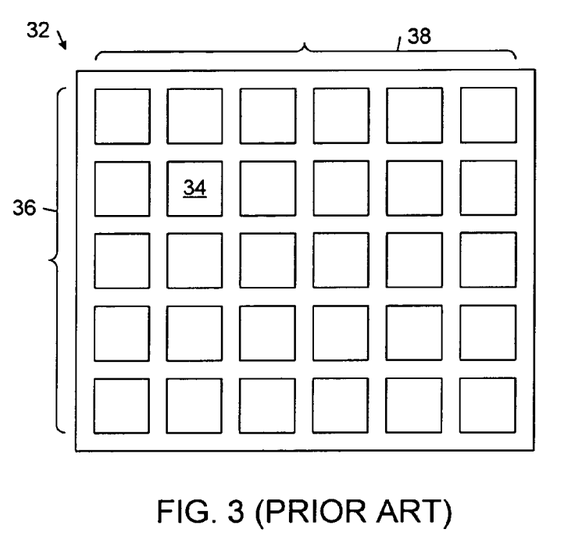
FIG. 3 is a diagrammatic top view of an embodiment of an image sensing component of an image sensor.

The image sensor 12 may be any type of imaging device that is capable of capturing one-dimensional or two-dimensional images of a scene. The image sensor 12 includes at least one image sensing component with a respective light sensing active area. Exemplary image sensing components include charge coupled devices (CCDs) and a complementary metal-oxide-semiconductor (CMOS) devices. FIG. 3 schematically shows an exemplary embodiment of an image sensing component 32 that includes an array of pixels 34 that are arranged in rows 36 and columns 38 in a capture plane. As shown diagrammatically in FIG. 1, the image sensor 12 has a field of view 40 that encompasses at least a portion of a scene. The image sensor 12 may include one or more lenses that focus light that is reflected or transmitted from the field of view 40 onto the active areas of one or more image sensing components of the image sensor 12.

The motion sensor 14 may be any type of motion sensing device that is capable of generating the motion sensor signals 24 that are indicative of motion of the image sensor 12 in relation to the scene being imaged. The motion sensor 14 includes at least one motion sensing component. Exemplary motion sensing components include optical motion sensing devices and inertial motion sensing devices.

In some embodiments, the motion sensor 14 includes an optical sensing device and a movement detector. The optical sensing device has a field of view that encompasses at least a portion of the scene being imaged by the image sensor 12. The optical sensing device captures images at a rate (e.g., 1500 pictures or frames per second or greater) that is fast enough so that sequential pictures of the scene overlap. The movement detector detects movement of the motion sensor in relation to the scene based on comparisons between images of the scene that are captured by the optical sensing device. In this process, the movement detector identifies texture or other features in the images and tracks the motion of such features across multiple images. In some implementations, the movement detector correlates features identified in successive images to compare the positions of the features in successive images to provide information relating to the position of the motion sensor 14 relative to the scene. The movement detector identifies common features in sequential images and determines the direction and distance by which the identified common features are shifted or displaced. In some embodiments, the movement detector translates the displacement information into two-dimensional position coordinates (e.g., X and Y coordinates) that correspond to the movement of the motion sensor 14. In some embodiments, the optical sensing device and the movement detector are implemented by separate discrete components of the image capture system 10. In other embodiments, at least one of the optical sensing device and the movement detector are incorporated into other components of the image capture system 10. For example, in some embodiments the optical sensing device is implemented by a respective region of the one or more image sensing devices of the image sensor 12 and the movement detector is implemented by one or more modules of the processing system 16.

In some embodiments, the motion sensor 14 includes an inertial sensor and a movement detector. The inertial sensor may include any type of inertia sensing device, including an accelerometer-based inertial sensing device and a gyroscope-based inertia sensing device. Accelerometers sense and respond to translational accelerations, whereas gyroscopes sense and respond to rotational rates. In some implementations, the inertial sensor includes at least two inertia sensing devices that are configured to sense motions in at least two respective directions. For example, in one implementation, the inertial sensor includes two inertia sensing devices that are oriented in orthogonal directions and are operable to sense movements in a plane (e.g., an X-Y plane in a two-dimensional Cartesian coordinate system) corresponding to the capture plane of the image sensor 12. In another implementation, the inertial sensor includes three inertia sensing devices that are operable to sense movements in three noncollinear directions (e.g., X, Y, and Z directions in a three-dimensional Cartesian coordinate system). This implementation allows motion of the image capture system 10 to be tracked independently of its orientation. For both accelerometer-based inertial sensing devices and gyroscope-based inertia sensing devices, the movement detector determines relative positions of the inertial devices by double integration of the signals generated by the devices over time. In some embodiments, the movement detector is implemented by separate discrete component (e.g., digital signal processor) of the image capture system 10. In other embodiments, the movement detector is implemented by one or more modules of the processing system 16.

In general, the processing system 18 may be implemented by one or more discrete modules that are not limited to any particular hardware, firmware, or software configuration. The one or more modules may be implemented in any computing or data processing environment, including in digital electronic circuitry (e.g., an application-specific integrated circuit, such as a digital signal processor (DSP)) or in computer hardware, firmware, device driver, or software. In some implementations, computer process instructions for implementing the image capture method shown in FIG. 2 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

II. Still Image Stabilization For Rolling Shutter Image Capture

In some embodiments, the image sensor 12 includes a two-dimensional complementary metal-oxide-semiconductor (CMOS) device that is operated in accordance with a rolling shutter capture process in which each row of pixels of the image sensor is sequentially scanned in order. A rolling shutter typically is implemented by sequentially resetting and reading the pixels of a two-dimensional CMOS photocell array row-by-row in a series of scanlines until the entire active area of the image sensor has been scanned. The exposure interval of each scanline is the time between the reset and readout, and the frame exposure period is the time needed to readout all the scan lines.

Figure 4:
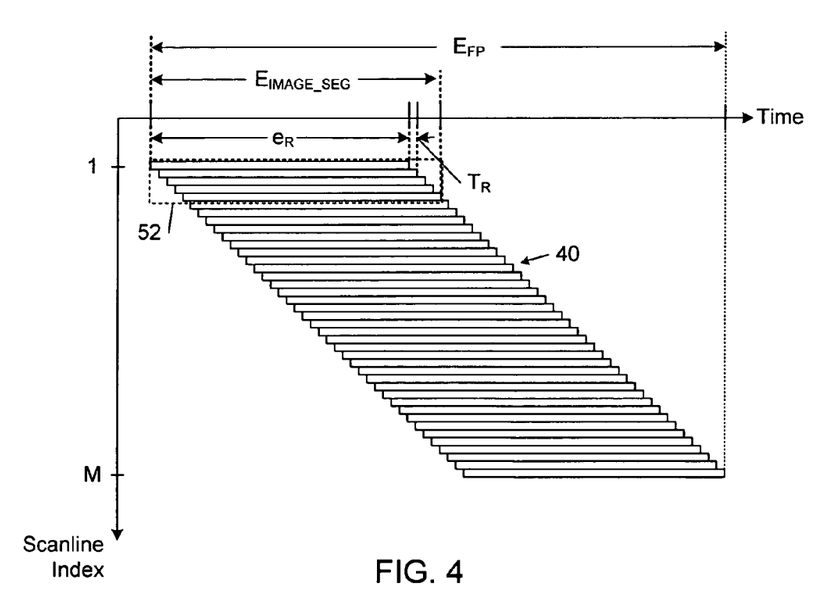
FIG. 4 is a schematic diagram of scanline exposure intervals during a frame exposure period in accordance with an embodiment of a rolling shutting mode of operating the image sensor shown in FIG. 3.

FIG. 4 shows schematic diagram of a devised set of scanline exposure intervals 40 during a frame exposure period in accordance with an exemplary embodiment of a rolling shutting mode of operating the image sensor 32 (shown in FIG. 3).

In this illustrative example, the parameter $e_R$ denotes the scanline exposure interval for the first scanline (i.e., scanline 1), the parameter $E_{FP}$ denotes the frame exposure period, and the parameter $T_R$ denotes the time required to readout each row of pixels. This exemplary rolling shutter mode of operation is characterized by the following constraints:

$$E_{FP}=e_R+M \cdot T_R \quad (1)$$

where M is the number of rows of pixels in an active area of the image sensor 32; the exposure of row i begins at time $t_{E,i}$, which is given by $$t_{E,i}=(i-1) \cdot T_R+t_{0,FP} \quad (2)$$

where $t_{0,FP}$ is the time at which frame exposure period FP begins; and the readout of row i occurs at time $t_{R,i}$, which is given by $$t_{R,i}=i \cdot T_R+e_R+t_{0,FP} \quad (3)$$

By design, the scanline exposure intervals occur at different times during the frame exposure period. Thus, any motion (e.g., handshaking) that occurs during the frame exposure period may blur the composite image that is formed from the pixels values that are captured in accordance with the rolling shutter image capture process.

Figure 5:
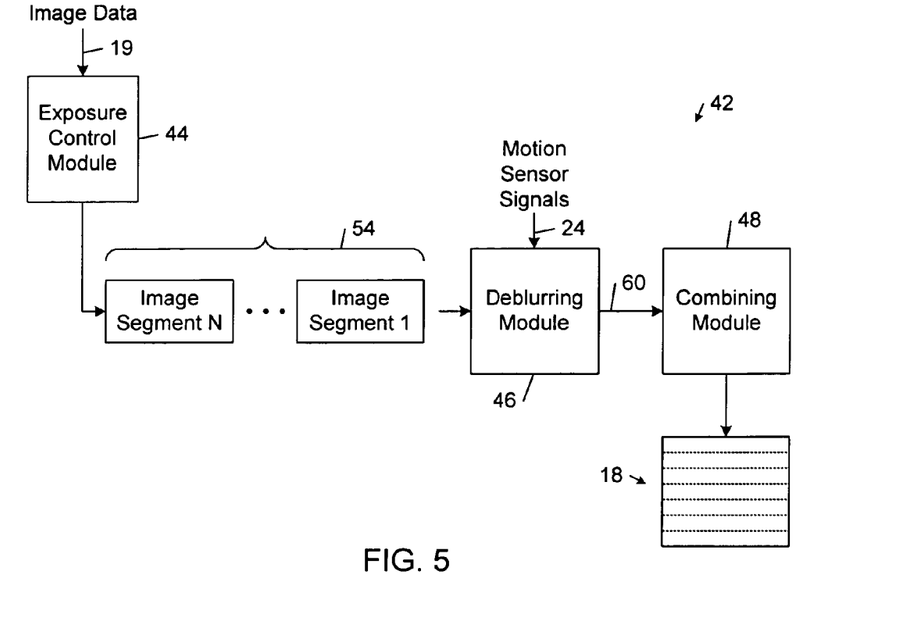
FIG. 5 is a block diagram of an embodiment of the processing system of the image capture system shown in FIG. 1.

FIG. 5 shows an embodiment 42 of the processing system 16 that reduces the appearance of blur that might be caused by motion of the image sensor 12 during a rolling shutter capture process. The processing system 42 includes an exposure control module 44, a deblurring module 46, and a combining module 48. The exposure control module 44, the deblurring module 46, and the combining module 48 are not limited to any particular hardware, firmware, or software configuration, but rather they may be implemented in any computing or data processing environment, including in digital electronic circuitry (e.g., an application-specific integrated circuit, such as a digital signal processor (DSP)) or in computer hardware, firmware, device driver, or software.

Figure 6:
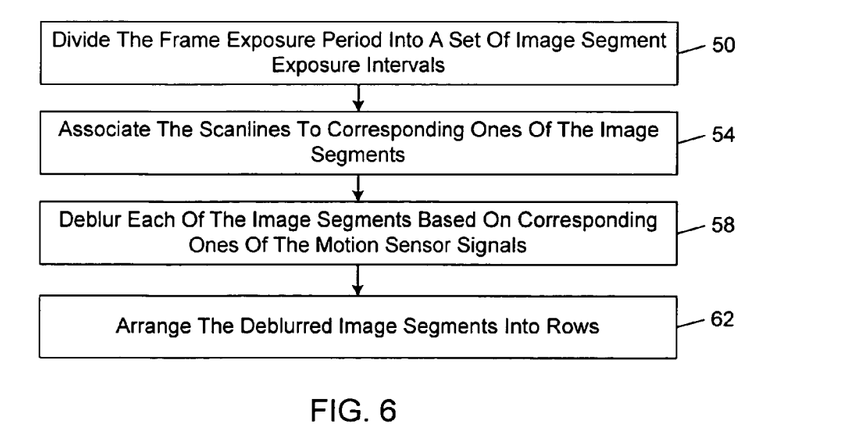
FIG. 6 is a flow diagram of an embodiment of the image capture method of FIG. 2.

FIG. 6 shows an embodiment of the image capture method of FIG. 2 that is implemented by the processing system 42.

In accordance with this method, the exposure control module 44 divides the frame exposure period into a set of image segment exposure intervals FIG. 6, block 50). Each of the image segment exposure intervals encompasses the exposure intervals of one or more of the scanlines that are captured during the frame exposure period.

Figure 7:
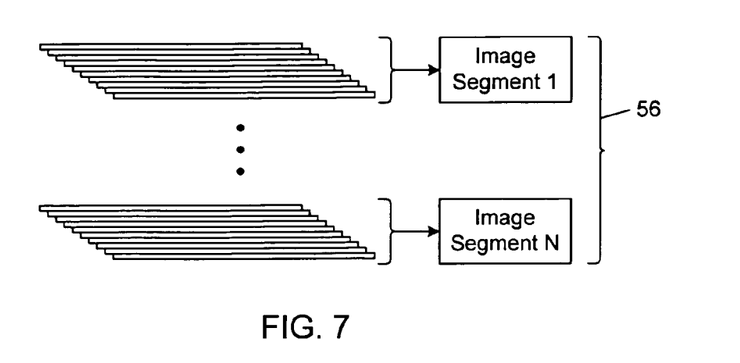
FIG. 7 is a schematic diagram of sets of respective ones of the scanline exposure intervals shown in FIG. 4 being mapped to corresponding image segments.

The exposure control module 44 associates the scanlines to corresponding ones of the image segments (FIG. 6, block 54). In this process, the exposure control module 44 maps (or associates) the respective sets of scanlines to the corresponding ones of the image segments, where each image segment exposure period corresponds to the time over which a respective set of one or more scanlines are captured (i.e., exposed and readout). In FIG. 4, an exemplary set of five scanlines is associated to a respective image segment 52, which has an exposure interval $E_{IMAGE\_SEG}$ that encompasses the exposure intervals of the five constituent scanlines. In the example shown in FIG. 7, the exposure control module 44 maps respective sets of ten scanlines to respective ones of the image segments 56. The scanlines that correspond to each image segment 54 may be stored sequentially in a frame buffer. After all the scanlines corresponding to a respective one of the image segments 54 have been stored, the stored image data is processed by the deblurring module 46 as follows.

The deblurring module 46 deblurs each of the image segments 54 based on the one or more corresponding motion sensor signals 24 (FIG. 6, block 58). The deblurring module 46 receives the motion sensor signals 24 from the motion sensor 14. In some embodiments, the motion sensor signals 24 include movement measures (e.g., relative position coordinates or displacements) describing movement the motion sensor 14 in relation to the scene in a form that is used for motion deblurring. In other embodiments, the deblurring module 46 derives the movement measures from the motion sensor signals 24. The deblurring module 46 correlates the movement measures with corresponding ones of the image segments 54.

Figure 8A:
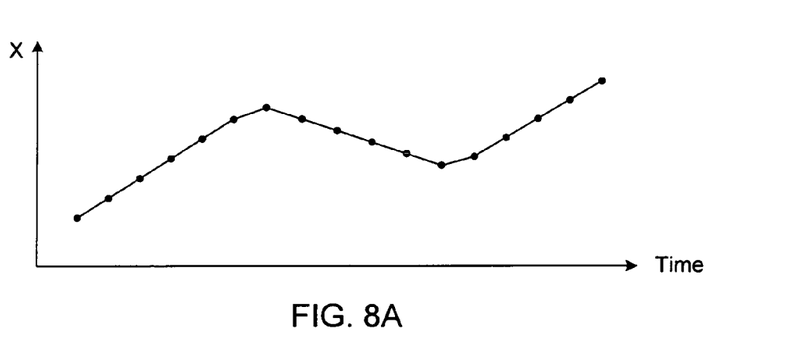
FIGS. 8A and 8B are devised graphs of horizontal and vertical position coordinates that are determined from motion sensor signals generated during the frame exposure period shown in FIG. 4.
Figure 8B:
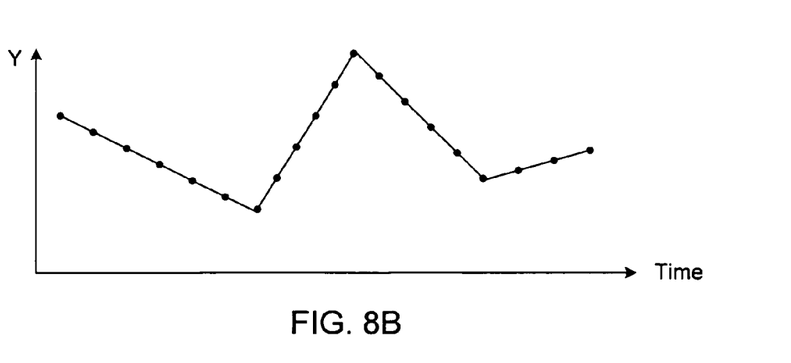

FIGS. 8A and 8B show devised graphs of exemplary sets of horizontal (X) and vertical (Y) position coordinates that are determined from the motion sensor signals 24 during the frame exposure period $E_{FP}$ (shown in FIG. 4). The sampling rate of the motion sensor signals 24 and the number of scanlines in each image segment 54 typically are selected so that the deblurring module 46 can associate at least two movement measures (e.g., position coordinates or displacements) with each image segment 54.

The deblurring module 46 determines the type of relative motion between the image sensor 12 and the scene based on the movement measures. In general, the type of relative motion can include one or more of a translation, a rotation, and a sudden change of scale. In some embodiments, the deblurring module 46 is operable to determine any one of these types of relative motion and selects an appropriate blur model for each of the image segments 54. In one exemplary embodiment, the deblurring module 46 determines for each image segment 54 a motion vector that describes the relative linear motion between the image sensor 12 and the scene. In this embodiment, the deblurring module 46 estimates for each image segment 54 a respective point-spread function that corresponds to a one-dimensional motion blur defined by the corresponding motion vector. The deblurring module 46 generates a respective deblurred image segment 60 from each image segment 54 by deconvolving the image segment 54 based on the corresponding estimated point-spread function. In general, the deblurring module 46 may generate the deblurred image segments using any of a wide variety of deconvolution processes, including an inverse filtering deconvolution process, a Wiener filtering deconvolution process, and a Richardson-Lucy deconvolution process.

The combining module 48 arranges the deblurred image segments 60 into rows (FIG. 6, block 62). In this process, the combining module 48 arranges the deblurred image segments 60 in a manner that preserves the original spatial arrangement of the original image segments 54. The combining module 48 may produce the resulting image as the output image 18 or it may apply one or more filters (e.g., a smoothing filter) to the resulting image and crop the filtered image before outputting the output image 18.

III. Still Image Stabilization for Divided Exposure Image Capture

In some embodiments, the image sensor 12 is operated in accordance with a divided exposure image capture process that obtains a composite image corresponding to a relatively long exposure period from a set of images that are captured with shorter exposure periods. A divided exposure image capture process typically is implemented by dividing a composite frame exposure period into a number of exposure divisions, integrating a respective image of the scene during each exposure division, and combining the images into the composite image. The resulting composite image typically is characterized by a lower noise level than a single image that is integrated over the entire composite frame exposure period.

Figure 9:
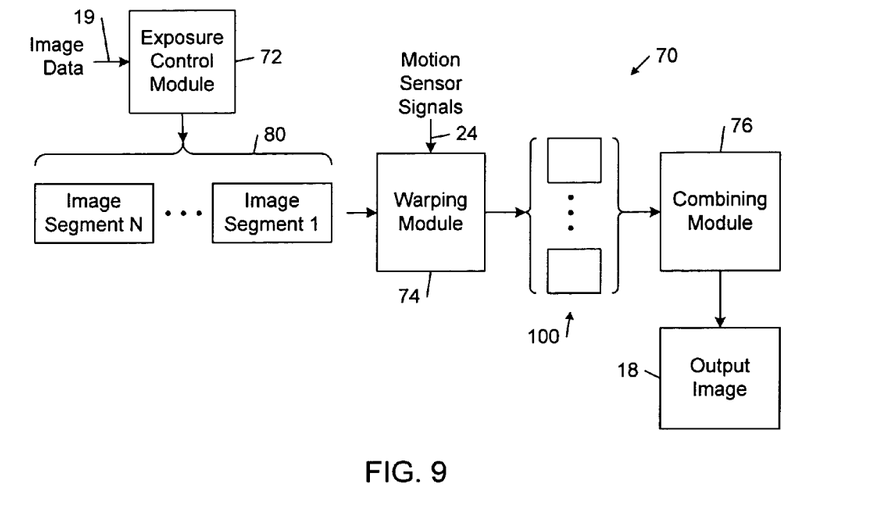
FIG. 9 is a block diagram of an embodiment of the processing system of the image capture system shown in FIG. 1.

FIG. 9 shows an embodiment 70 of the processing system 16 that reduces the appearance of blur that might be caused by motion of the image sensor 12 during a divided exposure capture process. The processing system 70 includes an exposure control module 72, a warping module 74, and a combining module 76. The exposure control module 72, the warping module 74, and the combining module 76 are not limited to any particular hardware, firmware, or software configuration, but rather they may be implemented in any computing or data processing environment, including in digital electronic circuitry (e.g., an application-specific integrated circuit, such as a digital signal processor (DSP)) or in computer hardware, firmware, device driver, or software.

Figure 10:
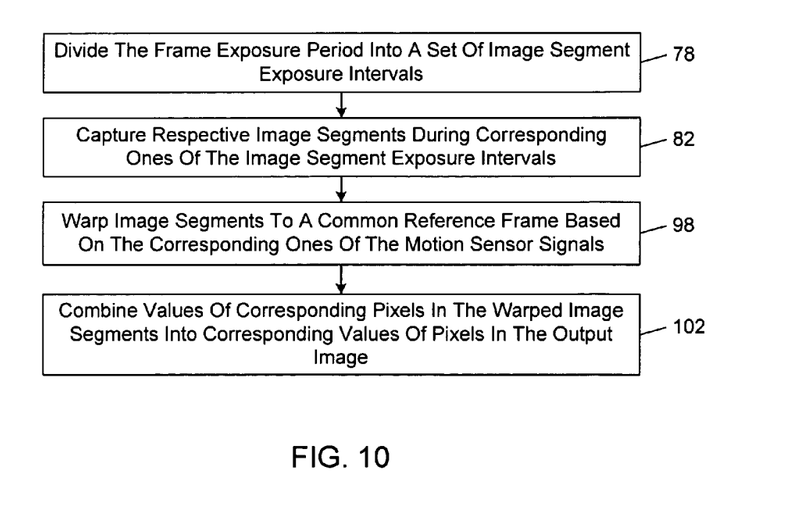
FIG. 10 is a flow diagram of an embodiment of the image capture method of FIG. 2.

FIG. 10 shows an embodiment of the image capture method of FIG. 2 that is implemented by the processing system 70.

The exposure control module 72 divides the frame exposure period into a set of image segment exposure periods (FIG. 10, block 78). The exposure control module 72 may divide the selected frame exposure period into the set of image segment exposure periods in accordance with any of a wide variety of different divided exposure methods. The number of exposure divisions typically is selected based at least in part on the processing and memory constraints of the image capture system.

The image sensor 12 captures respective image segments 80 during corresponding ones of the image segment exposure intervals (FIG. 10, block 82). In this process, the image sensor 12 integrates a respective image of the scene during each of the image segment exposure intervals. The exposure control module 72 identifies each of the captured images as a respective one of the image segments 80.

Figure 11:
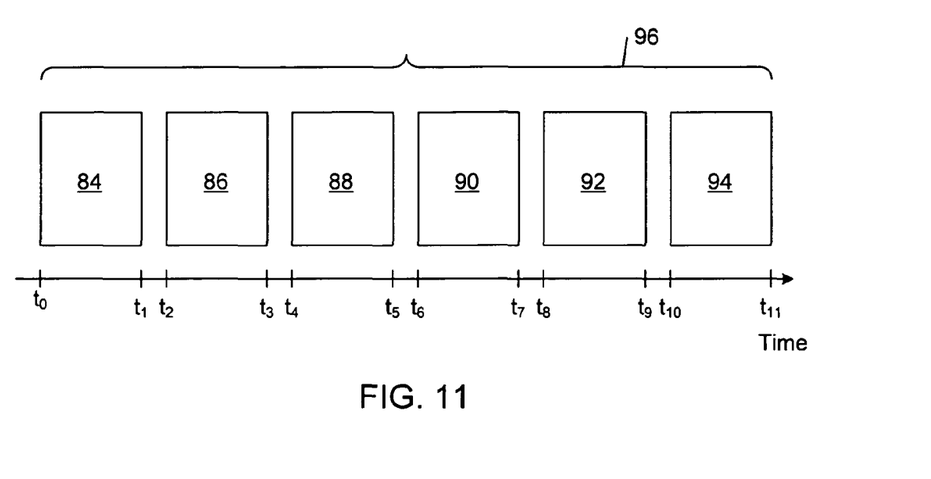
FIG. 11 is a schematic view of set of image segments captured within respective regions of an active area of an image sensor during a frame exposure period in accordance with a divided exposure capture process.

FIG. 11 shows an exemplary set of image segments 84-94 that are captured over a frame exposure period 96 that extends from time $t_0$ to $t_{11}$. In this example, the divided exposure period for image segment 84 is from $t_0$ to $t_1$, the divided exposure period for image segment 86 is from $t_2$ to $t_3$, the divided exposure period for image segment 88 is from $t_4$ to $t_5$, the divided exposure period for image segment 90 is from $t_6$ to $t_7$, the divided exposure period for image segment 92 is from $t_8$ to $t_9$, and the divided exposure period for image segment 94 is from $t_{10}$ to $t_{11}$.

Referring back to FIG. 10, the warping module 74 warps the image segments 80 to a common reference frame based on corresponding ones of the motion sensor signals 24 (FIG. 10, block 98). In this process, the warping module 74 receives the motion sensor signals 24 from the motion sensor 14. In some embodiments, the motion sensor signals 24 include movement measures (e.g., relative position coordinates or displacements) that describe movement of the motion sensor 14 in relation to the scene in a form that is used for image warping. In other embodiments, the warping module 74 derives the movement measures from the motion sensor signals 24. The warping module 74 correlates the movement measures with corresponding ones of the image segments 80.

Figure 12:
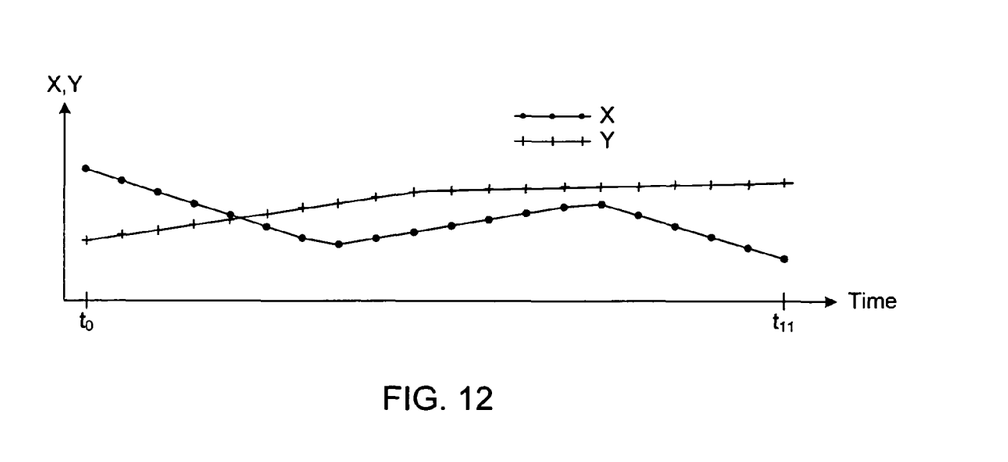
FIG. 12 is a devised graph of position measurements determined from motion sensor signals generated during the frame exposure period shown in FIG. 11.

FIG. 12 show a devised graph of exemplary sets of horizontal (X) and vertical (Y) position coordinates that are determined from the motion sensor signals 24 during the frame exposure period 96 (shown in FIG. 11). The sampling rate of the motion sensor signals 24 and the lengths of the divided exposure periods typically are selected so that the warping module 74 can associate at least two position coordinates with each image segment 80.

The warping module 74 warps the image segments 80 based on global motion vectors that describe motion of each of the image segments as a whole in relation to a designated reference frame or local motion vectors that describe the motion between regions of ones of the image segments 80 and the reference frame. The reference frame may correspond to the coordinate frame of one of the image segments 80. In some embodiments, the warping module 74 determines a respective motion map (or motion correspondence map) for each image segment 80. Each motion map includes a set of velocity motion vectors that map the pixels of a respective image segment to the pixels of the reference image. In general, the warping module 74 may compute the motion vectors based on any type of motion model. In one embodiment, the motion vectors are computed based on an affine motion model that describes motions that typically appear in image sequences, including translation, rotation, and zoom. The affine motion model is parameterized by six parameters as follows:

$$U = \begin{pmatrix} u \\ v \end{pmatrix} = \begin{pmatrix} a_{x0} & a_{x1} & a_{x2} \\ a_{y0} & a_{y1} & a_{y2} \end{pmatrix} \cdot \begin{pmatrix} x \\ y \\ z \end{pmatrix} = A \cdot \begin{pmatrix} x \\ y \\ z \end{pmatrix} \quad (4)$$

where u and v are the x-axis and y-axis components of a velocity motion vector at point (x,y,z), respectively, and the $A_k$'s are the affine motion parameters. Because there is no depth mapping information for a non-stereoscopic video signal, z=1. Each iamge segment $I_r(P)$ corresponds to the reference frame $I_t(P)$ in accordance with equation (5):

$$I_r(P) = I_t(P - U(P)) \quad (5)$$

where P=P(x, y) represents pixel coordinates in the coordinate system of the current video frame.

The warping module 74 determines the movement measures from an estimated affine model of the motion between each image segment 80 and the reference frame. In some embodiments, the affine model is estimated by applying a least squared error (LSE) regression to the following matrix expression:

$$A = (X^T X)^{-1} X^T U \quad (6)$$

where X is given by:

$$X = \begin{pmatrix} x_1 & x_2 & \cdots & x_N \\ y_1 & y_2 & \cdots & y_N \\ 1 & 1 & \cdots & 1 \end{pmatrix} \quad (7)$$

and U is given by:

$$U = \begin{pmatrix} u_1 & u_2 & \cdots & u_N \\ v_1 & v_2 & \cdots & v_N \end{pmatrix} \quad (8)$$

where N is the number of samples (i.e., the selected object blocks). Each sample includes an observation ($x_i, y_i, 1$) and an output ($u_i, v_i$) that are the coordinate values in the current and previous video frames associated by the corresponding motion vector. Singular value decomposition may be employed to evaluate equation (6) and thereby determine A. In this process, the motion estimation module 18 iteratively computes equation (6). Iteration of the affine model typically is terminated after a specified number of iterations or when the affine parameter set becomes stable to a desired extent. To avoid possible divergence, a maximum number of iterations may be set.

After the image segments 80 have been warped to the common reference frame (FIG. 10, block 98), the combining module 76 combines values of corresponding pixels in the warped image segments 100 into corresponding values of pixels in the output image 18 (FIG. 10, block 102). In some embodiments, the combining module 76 averages the values of corresponding pixels in the warped image segments to obtain values of the pixels in the output image 18. The combining module 76 may produce the resulting image as the output image 18 or it may apply one or more filters (e.g., a smoothing filter) to the resulting image before producing the output image 18. The combining module 76 typically crops the composite image before outputting it as the output image 18.

IV. Exemplary Operating Environment For The Image Capture System

As explained above, the image capture system 10 is highly suitable for incorporation in compact camera environments that have significant size, processing, and memory constraints, including but not limited to handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), pc cameras, and other embedded environments.

In some embodiments, the image capture system 10 is integrated into a handheld device that includes a telephone subsystem. The telephone subsystem may correspond to any of a variety of different types of telephones, including a wired telephone and a wireless telephone (e.g., a cellular telephone and a cordless telephone). The telephone subsystem converts sounds into electrical signals and vice versa. In particular, the telephone subsystem transduces between audio signals and telephony signals. In this regard, the telephone subsystem typically includes a microphone for converting received audio signals into electrical signals and a speaker for converting received electrical signals into audio signals. The telephone subsystem communicates the telephony signals over a telephony communications channel. The telephony signals may formatted in accordance with any of a variety of different telephone protocols, including public switched telephone network protocols (e.g., Signaling System 7 and Intelligent Network), analog cellular telephone protocols (e.g., Advanced Mobile Phone Service), digital cellular telephone protocols (e.g., TDMA, CDMA, GSM, and WAP), and cordless telephone protocols (e.g., Digital Enhanced Cordless Telecommunications). The telephony communications channel couples the handheld device to a telephone system, which may include one or more of a wireless telephone network, a wired telephone network (e.g., a PSTN), and a cordless telephone base station.

Figure 13:
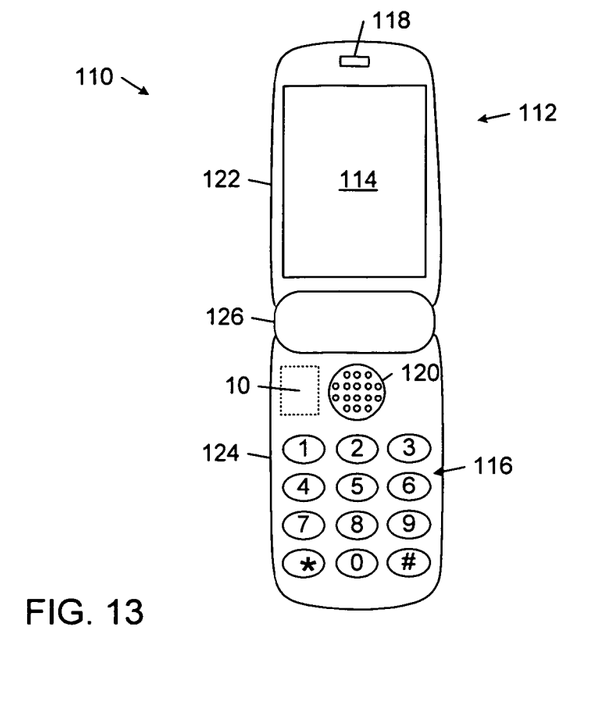
FIG. 13 is a diagrammatic top view of an embodiment of a mobile telephone in an open state.

FIG. 13 shows an embodiment 110 of the handheld device 40 (e.g., a mobile telephone, such as a cellular telephone or a cordless telephone) that includes a housing 112, a display screen 114, a keypad 116, a microphone 118, and a speaker 120. The display screen 112 and the microphone 118 are exposed through an inner face of a top part 122 of the housing 112. The keypad 116 and the speaker 120 are exposed through an inner face of a bottom part 124 of the housing 62. The top and bottom parts 122, 124 of the housing 112 are connected together by a hinged portion 126, which allows the top and bottom parts 122, 124 to pivot between an open state and a closed state. In the open state shown in FIG. 13, a user has access to the displays screen 114, the keypad 116, the microphone 118, and the speaker 120.

Figure 14:
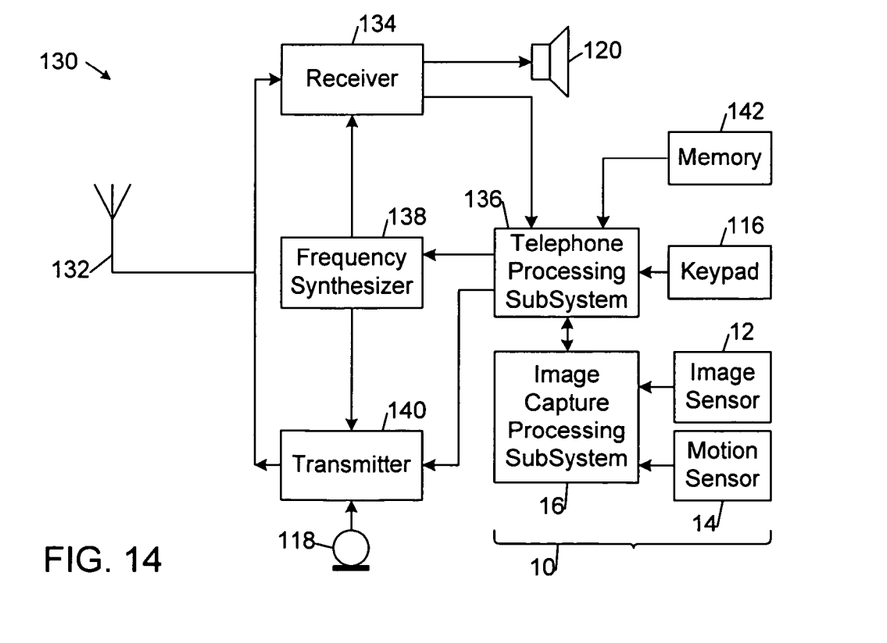
FIG. 14 is a block diagram of an embodiment of the image capture system of FIG. 1 and a telephone subsystem that are integrated within the housing of the mobile telephone shown in FIG. 13.

FIG. 14 shows an embodiment 130 of the handheld device 110 that includes the image capture system 10 and a telephone subsystem. The image capture system 10 includes the image sensor 12, the motion sensor 14, and an image capture processing subsystem that corresponds to the processing system 18. The telephone subsystem includes an antenna 132, a receiver 134, the speaker 120, a telephone processing subsystem 136, a frequency synthesizer 138, a transmitter 140, the microphone 118, the keypad 116, and a memory 142. The telephone processing subsystem 136 choreographs the operation of the receiver 134, the transmitter 140, and the frequency synthesizer 138. The frequency synthesizer 138 controls the operating frequencies of the receiver 134 and the transmitter 140, and generates electronic radio frequency signals in response to control signals received from the processing system 108.

V. Conclusion

The embodiments that are described in detail herein are capable of reducing motion-induced blur in still images within the significant size, processing, and memory constraints of typical compact camera environments.

Other embodiments are within the scope of the claims.

What is claimed is:

1. An apparatus, comprising:
an image sensor operable to capture image segments during corresponding exposure intervals of a frame exposure period;
a motion sensor operable to generate respective motion sensor signals during the respective exposure intervals of the image segments, wherein the motion sensor comprises image sensing elements operable to capture images of a scene; and
a processing system operable to determine from the respective motion sensor signals one or more corresponding movement measures for each of the exposure intervals and combine the image segments into an output image based on the one or more corresponding movement measures, wherein the processing system is operable to determine the movement measures from comparisons of ones of the images captured by the image sensing elements of the motion sensor;
wherein at least a portion of the image sensing elements are further operable to capture the images in accordance with a rolling shutter process that is determined by:

$E_{FP} = e_R + M \ast T_R$, $t_{E,i} = (i-1) \ast T_R + t_{0,FP}$, and $t_{R,i} = i \ast T_R + e_R + t_{0,FP}$, wherein $e_R$ denotes a scanline exposure interval, $E_{FP}$ denotes a frame exposure period, $T_R$ denotes readout time for each row of pixels, M is the number of rows of pixels in an active area of the image sensor, exposure of row i begins at time $t_{E,i}$, $t_{0,FP}$ is a time at which frame exposure period FP begins, and readout of row i occurs at time $t_{R,i}$.

2. The apparatus of claim 1, wherein the image sensor comprises an array of pixels arranged in rows and columns in a capture plane and the image sensor captures each of the image segments by reading out values of the pixels across a respective subset of the rows of pixels integrated over the corresponding exposure interval.

3. The apparatus of claim 2, further comprising an exposure controller operable to control the capture of the image segments by the image sensor in accordance with a rolling shutter capture process.

4. The apparatus of claim 2, wherein the processing system combines the image segments by deblurring each of the image segments based on the one or more corresponding movement measures and arranging the deblurred image segments along respective rows of the output image.

5. The apparatus of claim 1, wherein the image sensor comprises an array of pixels arranged in rows and columns in a capture plane and the image sensor captures each of the image segments by reading out values of the pixels across the capture plane integrated over the corresponding exposure interval.

6. The apparatus of claim 5, wherein the processing system combines the image segments by warping the image segments to a common reference frame based on the one or more corresponding movement measures and combining values of corresponding pixels in the warped image segments into corresponding values of pixels in the output image.

7. The apparatus of claim 1, further comprising a telephone subsystem and a housing containing the image sensor, the motion sensor, the processing system, and the telephone subsystem.

8. A method, comprising:
capturing image segments during corresponding exposure intervals of a frame exposure period;
generating respective motion sensor signals during the respective exposure intervals of the image segments, wherein the generating comprises capturing images of a scene;
determining from the respective motion sensor signals one or more corresponding movement measures for each of the exposure intervals, wherein the determining comprises deriving the movement measures from comparisons of ones of the captured images; and
combining the image segments into an output image based on the one or more corresponding movement measures;
wherein the movement measures are determined based on:

$$U = \begin{pmatrix} u \\ v \end{pmatrix} = \begin{pmatrix} a_{x0} & a_{x1} & a_{x2} \\ a_{y0} & a_{y1} & a_{y2} \end{pmatrix} \cdot \begin{pmatrix} x \\ y \\ z \end{pmatrix} = A \cdot \begin{pmatrix} x \\ y \\ z \end{pmatrix},$$

$I_r(P) = I_t(P - U(P))$, $A = (X^T X)^{-1} X^T U$, $$X = \begin{pmatrix} x_1 & x_2 & \ldots & x_N \\ y_1 & y_2 & \ldots & y_N \\ 1 & 1 & \ldots & 1 \end{pmatrix}, \text{ and}$$

$$U = \begin{pmatrix} u_1 & u_2 & \ldots & u_N \\ v_1 & v_2 & \ldots & v_N \end{pmatrix},$$

wherein U is the affine motion model, u and v are the x-axis and y-axis components of a velocity motion vector at point (x, y, z), $a_{x0}$, $a_{x1}$, $a_{x2}$, $a_{y0}$, $a_{y1}$, and $a_{y2}$ are the affine motion parameters, N is the number of samples, and image segment Ir(P) corresponds to reference frame It(P) and P=P(x,y), representing pixel coordinates.

9. The method of claim 8, wherein the capturing comprises capturing each of the image segments by reading out values of pixels across a respective subset of rows of a two-dimensional array of pixels integrated over the corresponding exposure interval.

10. The method of claim 9, wherein the combining comprises deblurring each of the image segments based on the one or more corresponding movement measures and arranging the deblurred image segments along respective rows of the output image.

11. The method of claim 8, wherein the capturing comprises capturing each of the image segments by reading out values of pixels across a two-dimensional array of pixels integrated over the corresponding exposure interval.

12. The method of claim 11, wherein the capturing is performed in accordance with a divided exposure capture process.

13. The method of claim 11, wherein the combining comprises warping the image segments to a common reference frame based on the one or more corresponding movement measures and combining values of corresponding pixels in the warped image segments into corresponding values of pixels in the output image.

14. An apparatus, comprising:
means for capturing image segments during corresponding exposure intervals of a frame exposure period;
means for generating respective motion sensor signals during the respective exposure intervals of the image segments, wherein the means for generating comprises means for capturing images of a scene;
means for determining from the respective motion sensor signals one or more corresponding movement measures for each of the exposure intervals, wherein the means for determining comprises means for deriving the movement measures from comparisons of ones of the captured images; and
means for combining the image segments into an output image based on the one or more corresponding movement measures;
wherein the means for capturing images of a scene captures images in accordance with a rolling shutter process that is determined by:

$$E_{FP}=e_R+M*T_R,$$

$$T_{E,i}=(i-1)*T_R+t_{0,FP}, \text{ and}$$

$$t_{R,i}=i*T_R+e_R+t_{0,FP},$$

wherein $e_R$ denotes a scanline exposure interval, $E_{FP}$ denotes a frame exposure period, $T_R$ denotes readout time for each row of pixels, M is the number of rows of pixels in an active area of the image sensor, exposure of row i begins at time $t_{E,i}$, $t_{0,FP}$ is a time at which frame exposure period FP begins, and readout of row i occurs at time $t_{R,i}$.

15. The apparatus of claim 1, wherein the image sensing elements of the motion sensor are implemented separately from the image sensor.

16. The apparatus of claim 1, wherein the image sensing elements of the motion sensor are implemented by a region of the image sensor.

17. The method of claim 8, further comprising:
using an image sensor to capture the image segments; and
using separate image sensing elements to capture the images of the scene for the motion sensor signals.

18. The method of claim 8, further comprising:
using an image sensor to capture the image segments; and
using a region of the image sensor to capture the images of the scene for the motion sensor signals.

* * * * *